United States Patent
Gunji et al.

(10) Patent No.: US 8,173,317 B2
(45) Date of Patent: May 8, 2012

(54) FUEL CELLS POWER GENERATION SYSTEM

(75) Inventors: Akira Gunji, Hitachinaka (JP); Hiromi Tokoi, Tokai (JP); Shin Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1322 days.

(21) Appl. No.: 11/627,386

(22) Filed: Jan. 26, 2007

(65) Prior Publication Data
US 2008/0107946 A1    May 8, 2008

(30) Foreign Application Priority Data
Nov. 8, 2006    (JP) .................................. 2006-302871

(51) Int. Cl.
*H01M 8/24*    (2006.01)

(52) U.S. Cl. ........ 429/446; 429/444; 429/454; 429/495; 429/497

(58) Field of Classification Search .................... 429/31, 429/38, 34, 30, 452, 454, 456, 495, 497
See application file for complete search history.

(56) References Cited

U.S. PATENT DOCUMENTS

| 4,827,606 A | * | 5/1989 | Szreders et al. | 29/729 |
| 5,573,867 A | * | 11/1996 | Zafred et al. | 429/17 |
| 6,416,899 B1 | * | 7/2002 | Wariishi et al. | 429/38 |

FOREIGN PATENT DOCUMENTS

| JP | 2002-289250 | 10/2002 |
| JP | 2006-066387 | 3/2006 |
| WO | WO 2005057697 A2 * | 6/2005 |

OTHER PUBLICATIONS

JP Office Action of Appln. No. 2006-302871 dated Feb. 21, 2012 with partial English language translation.

* cited by examiner

*Primary Examiner* — Ula C Ruddock
*Assistant Examiner* — Heng Chan
(74) *Attorney, Agent, or Firm* — Antonelli, Terry, Stout & Kraus, LLP.

(57) ABSTRACT

In a fuel cells power generation system provided with a power generation module having a plurality of fuel cells, the structure is made such that a cross sectional area of at least one of a fuel flow path and an air flow path is larger in an inner portion of the power generation module and smaller in an outer portion thereof. Accordingly, gas tends to flow through the inner portion of the power generation module, a gas flow rate is quickened, and it is possible to uniformize a molar flow rate of the fuel and the air supplied to the fuel cell, even in a state in which a temperature distribution of the module is not uniform within the power generation module.

9 Claims, 5 Drawing Sheets

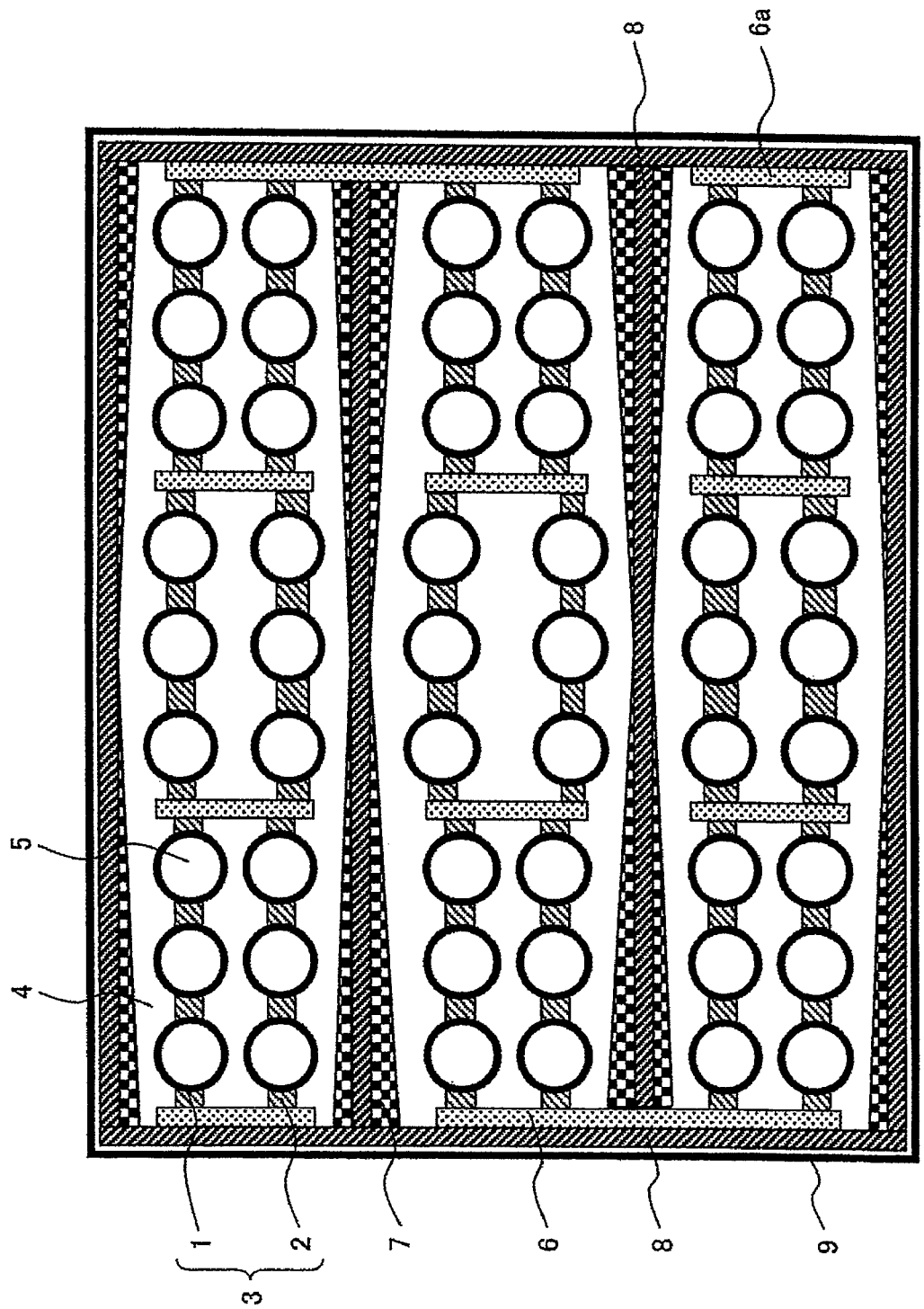

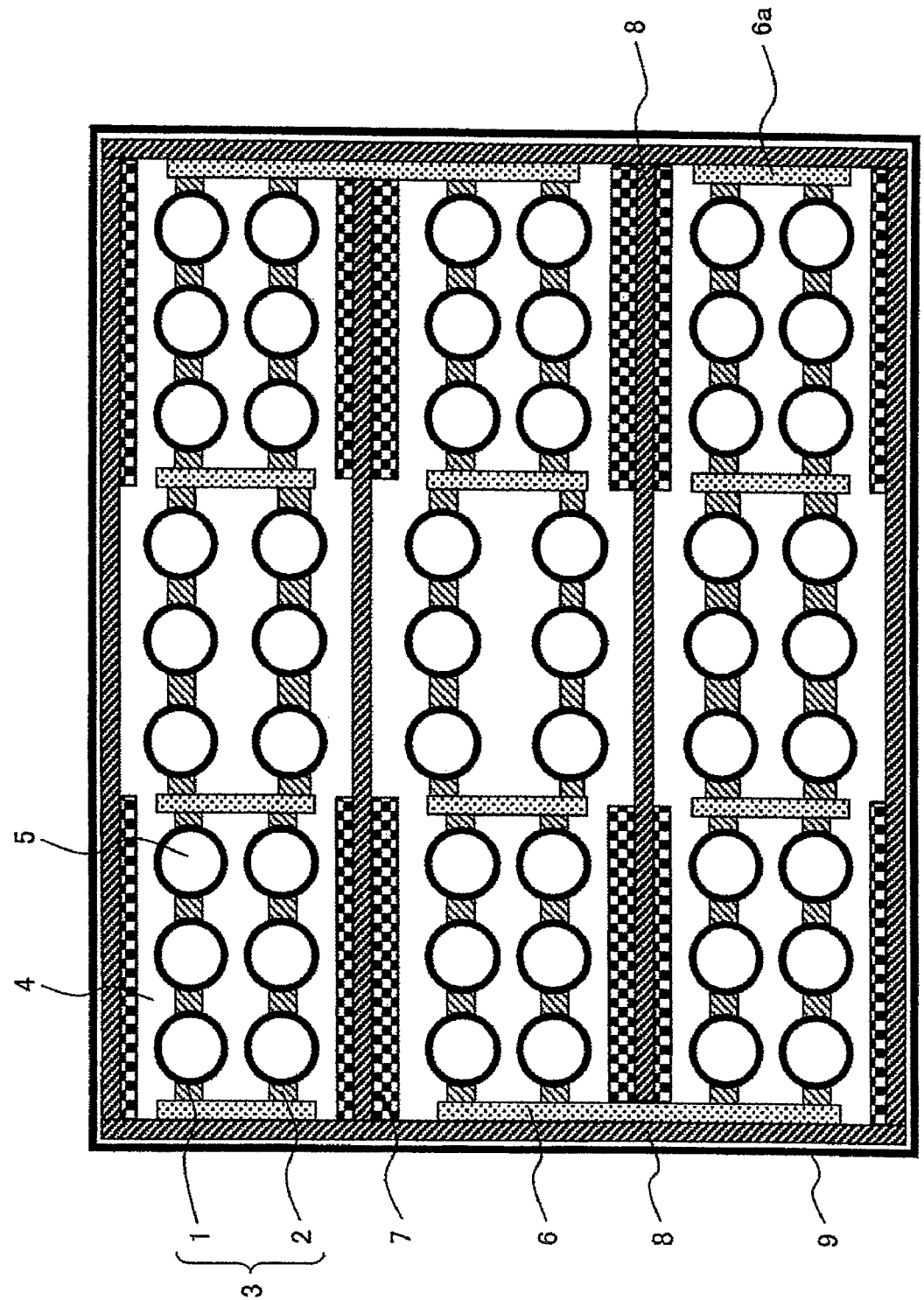

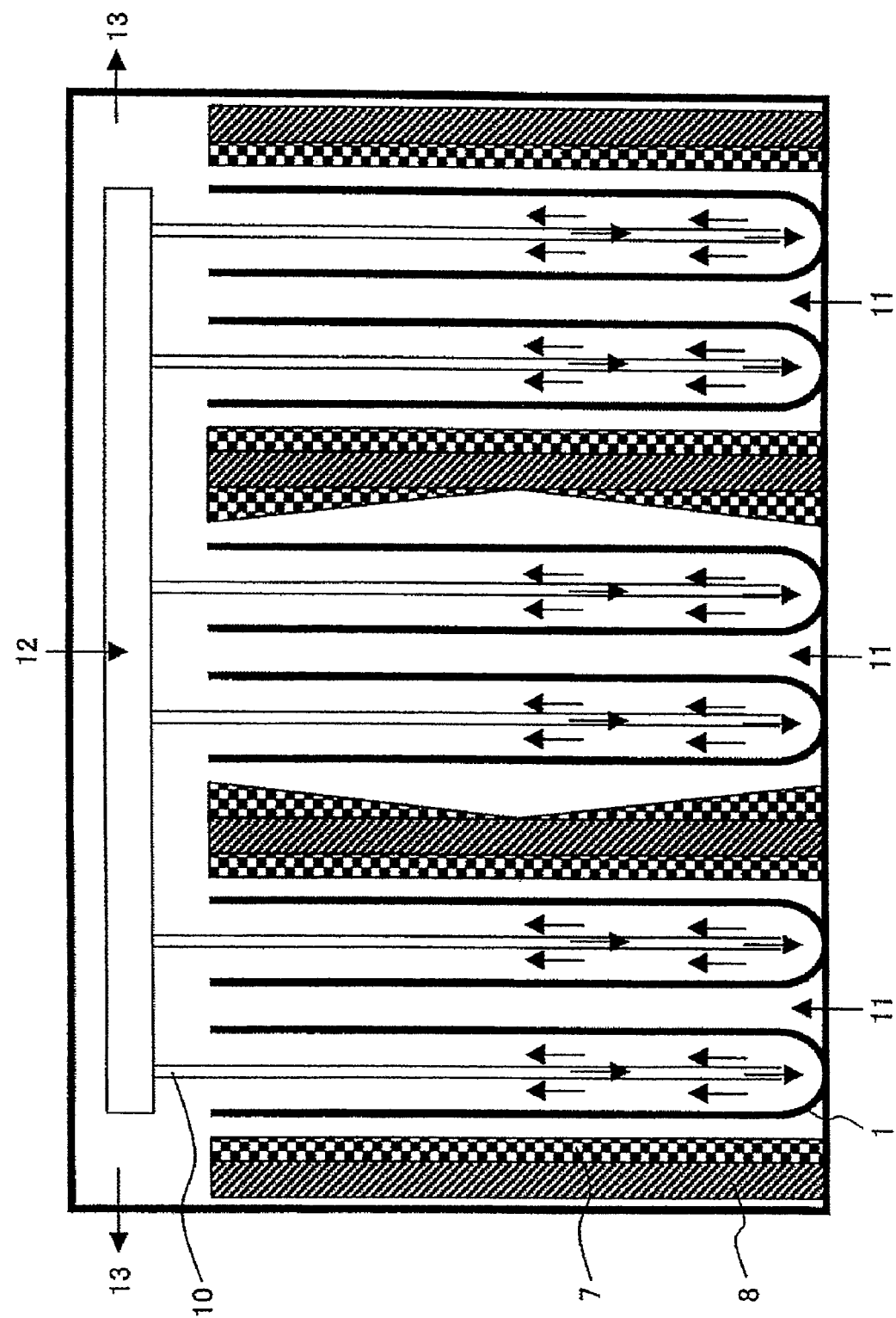

FUEL CELLS POWER GENERATION SYSTEM

FIELD OF THE INVENTION

The present invention relates to a fuel cells power generation system provided with a power generation module obtained by assembling a plurality of fuel cells, and more particularly to a fuel cells power generation system which is preferable for a system provided with a solid oxide fuel cell.

DESCRIPTION OF RELATED ART

The fuel cell is a power generation apparatus which is provided with an anode (fuel electrode) on one side with respect to an electrolyte and with a cathode (an oxidizer electrode) on the other side, and executes an electrochemical reaction (a cell reaction) of a fuel supplied to the anode side and an oxidizer supplied to the cathode side via the electrolyte so as to generate power. Since an air is generally used for the oxidizer, the cathode is also called as an air electrode. A voltage obtained by one fuel cell is about 1 Volt, however, it is possible to obtain a high power by connecting a plurality of fuel cells, and a power generation module provided with a plurality of fuel cells is formed in an actual power generation system. The solid oxide fuel cell corresponding to one kind of the fuel cells is not only provided with a high power generation efficiency, but, by operating at a high temperature between 700 and 1000° C., it is possible to also execute a reforming reaction of the fuel inside of the fuel cell module, and thus, it is possible to use various fuels. Further, since it is possible to directly utilize the fuel without reforming the fuel outside of the fuel cell module, an apparatus becomes simple, and there is a higher possibility of a cost reduction in comparison with the other fuel cells. In addition, it is possible to combine various bottoming cycles by using a high-temperature exhaust heat, and it is easy to form a system suiting to an intended use.

A high operating temperature has the advantage mentioned above, but has such a disadvantage that a temperature distribution tends to be not uniform. In a power generation state, the temperature in the power generation module is maintained by a heat of an internal resistance, however, a temperature of an outer portion of the power generation module becomes lower due to a heat release in comparison with an inner portion thereof. In the case that the temperature of the fuel cell is too low, an overpotential of the electrochemical reaction is enlarged, and a reduction of the power generation efficiency is caused. Further, in the case that the temperature of the fuel cell is too high, a deterioration of the fuel cell and a constituting member tends to be generated. Accordingly, it is important to keep the power generation module in a suitable temperature range, and to lower the temperature difference in the temperature distribution of the module.

The temperature distribution within the power generation module affects the temperatures of the fuel and the air which are supplied to the fuel cell. In the case that the fuel and the air are supplied to a plurality of fuel cells within the power generation module at the same flow rate, a molar flow rate of the fuel and the air which are supplied to the fuel cell in the inner portion coming to a high temperature becomes smaller in comparison with the outer portion, thereby causing a voltage reduction or a current density reduction due to a local ascent of a fuel utilization and an air utilization.

As a method of reducing the temperature distribution of the power generation module, there has been known a method of circulating the low-temperature air and fuel in the inner portion of the power generation module (for example, refer to JP-A-2002-289250). In order to reduce the temperature difference in the temperature distribution of the power generation module, it is an effective method to circulate the low-temperature air and fuel in the inner portion of the power generation module, however, this method is insufficient in respect of uniformizing of the temperature distribution. If the temperature distribution is not uniform within the power generation module, an unevenness of the molar flow rate of the fuel and the air which are supplied to the fuel cell is generated, and the power generation efficiency is lowered.

BRIEF SUMMARY OF THE INVENTION

An object of the present invention is to provide a fuel cells power generation system which can uniformize molar flow rates of a fuel and an air supplied to a fuel cell even in a state in which a temperature distribution is not uniform within a power generation module.

In accordance with the present invention, there is provided a fuel cells power generation system comprising:

a power generation module provided with a plurality of fuel cells each having an anode on one side and having a cathode on the other side via an electrolyte;

a fuel flow path supplying a fuel to an anode surface of the fuel cell; and an oxidizer flow path supplying an oxidizer to a cathode surface thereof, wherein a flow path cross sectional area of at least one of the fuel flow path and the oxidizer flow path is made larger in an inner portion of the power generation module in comparison with an outer portion thereof.

In accordance with the present invention, there is provided a fuel cells power generation system in which a bundle is formed by electrically connecting a plurality of cylindrical fuel cells, a power generation module is formed by collecting a plurality of the bundles and electrically connecting the bundles by a collecting plate, and an outer space of cylindrical fuel cells forms a gas flow path of the fuel or the oxidizer and an inner space of the cylindrical fuel cells forms a gas flow path of the oxidizer or the fuel, respectively, wherein a cross sectional area of the gas flow path formed in the outer space of the cylindrical fuel cell is larger in the inner portion of the power generation module in comparison with the outer portion thereof.

In accordance with the present invention, there is provided a fuel cells power generation system in which the power generation module is formed by arranging a plurality of lines in parallel, each of which lines is formed by disposing the above-mentioned bundles linearly, the lines of bundles are comparted from each other by an electrical insulating plate, and an outer space of the cylindrical fuel cells forms the gas flow path of the fuel or the oxidizer and the inner space of the cylindrical fuel cells forms the gas flow path of the oxidizer or the fuel, respectively, wherein a cross sectional area of the gas flow path formed in the outer space of the cylindrical fuel cell is larger in an inner portion of the bundle in comparison with an outer portion thereof, and the cross sectional area of the inner portion of the bundle positioned in the middle line of the power generation module is the largest.

In accordance with the present invention, the gas tends to flow in the inner portion of the power generation module, and the gas flow rate becomes higher. As a result, even in a state in which the temperature distribution is not uniform within the power generation module, it is possible to uniformize the molar flow rate of the gas supplied to the fuel cell. Further, even in the case that the gas flow rate is uniform, a volume flow rate of the gas supplied to the fuel cell in the inner portion becomes larger in correspondence to a flow path area rate. As a result, even in the state in which the temperature distribution is not uniform within the power generation module, it is possible to uniformize the molar flow rate of the gas supplied to the fuel cell.

Other objects, features and advantages of the invention will become apparent from the following description of the embodiments of the invention taken in conjunction with the accompanying drawings.

BRIEF DESCRIPTION OF THE SEVERAL VIEW OF THE DRAWINGS

FIG. 3 is a schematic view of a fuel cells power generation module in accordance with a third embodiment of the present invention;

FIG. 4 is a schematic view of a fuel cells power generation module in accordance with a fourth embodiment of the present invention; and FIG. 5 is a schematic view of a fuel cells power generation module in accordance with a fifth embodiment of the present invention.

DETAILED DESCRIPTION OF THE INVENTION

The present invention is structured by making a cross sectional area of at least one of a gas flow path supplying a fuel to an anode of a fuel cell and a gas flow path supplying an air to a cathode larger in an inner portion of a power generation module coming to a high temperature, in comparison with an outer portion thereof.

The present invention is particularly suitable for a power generation system provided with a solid oxide fuel cell. A description will be in detail given below of a power generation system provided with a solid oxide fuel cell as an example. In this case, in the solid oxide fuel cell, a ceramic such as a yttria stabilized zirconia or the like is used for a solid electrolyte, and is roughly classified into a cylindrical shape and a flat plate shape, however, the present invention can be applied to both of the shapes. A description will be given below particularly of a fuel cell having a cylindrical vertical striped pattern as an example.

Embodiment 1

Figure 1:
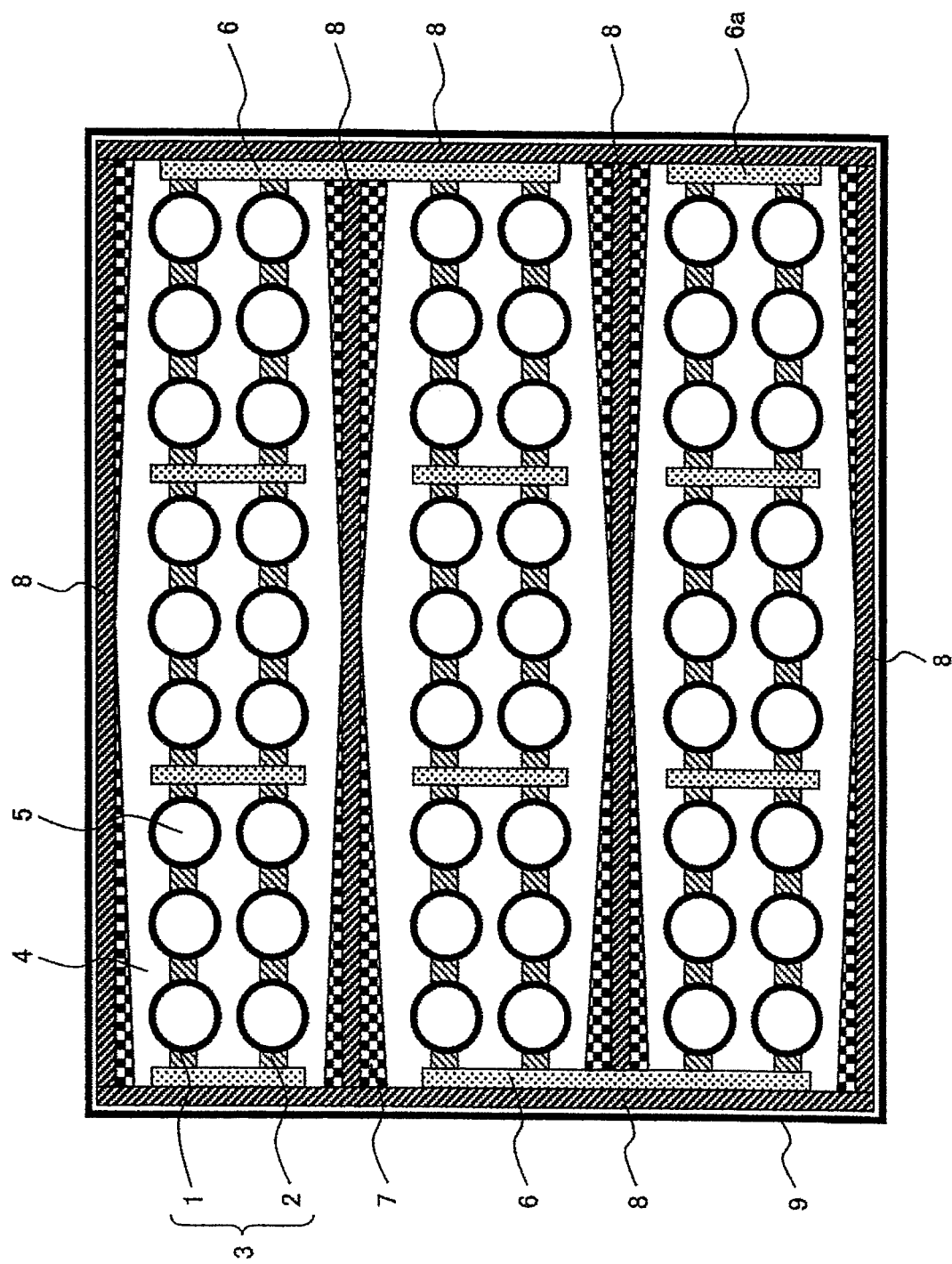
FIG. 1 is a schematic view of a fuel cells power generation module in accordance with a first embodiment of the present invention.

A horizontal cross sectional view of a power generation module provided with a plurality of closed-tube shaped solid oxide fuel cells, each of which is closed at one end, is shown in FIG. 1. A fuel cell 1 shown in FIG. 1 is provided with a cathode on an inner surface of a tubular electrolyte, and an anode on an outer surface thereof. However, the present invention can be applied even to a case that positions of the cathode and the anode are inverted.

A bundle 3 corresponding to a fuel cell assembly is formed by electrically connecting the fuel cells 1 to each other by a collecting member 2. The bundles 3 are electrically connected to each other by a collecting plate 6, and an electric current is taken out from a collecting plate 6a in an end portion.

A space on an outer side of the fuel cell is utilized as a fuel flow path 4, and a space on an inner side thereof is utilized as an air flow path 5, and the fuel and the air flow in parallel to an axial direction of the fuel cell 1. Further, the fuel and the air flow in parallel. A cell container 9 seals the fuel so as to prevent the fuel from leaking out.

An electrical insulating plate 8 is inserted between the bundles 3 arranged in parallel to each other, between the bundle 3 and the cell container 9, and between the collecting plate 6 and the cell case 9, so as to electrically insulate them. In the present embodiment, three lines of bundles 3 are arranged in parallel. Further, a distance between the electrical insulating plates 8 in a middle line is designed to be larger than a distance between the electrical insulating plates 8 in lines of outer or end portions.

Further, in order to adjust a cross sectional area of the fuel flow path 4, a flow path cross sectional area adjusting member 7 is arranged on both surfaces of the electrical insulating plate 8 inserted between the bundles 3 arranged in parallel. In the present embodiment, a plate in which a thickness of the inner or center portion is small and a thickness of the outer portion is large is employed as the flow path cross sectional area adjusting member 7.

Since the flow path cross sectional area adjusting member 7 is arranged on both the surfaces of the electrical insulating plate 8, the fuel flow path 4 becomes wider toward the inner portion in each of the bundles. Further, among the modules arranged in three lines, the fuel flow path in the inner portion of the bundle existing in the middle line becomes widest.

In the power generation module in which a plurality of lines are arranged in parallel, each of which lines is constituted by the bundle formed by electrically connecting a plurality of fuel cells, such as the power generation module shown in FIG. 1, a temperature distribution is not uniform even in the bundle positioned at the outer portion of the power generation module. In other words, a lot of walls exist in the periphery of the outer portion of the bundle in comparison with the inner portion thereof, and heat tends to be released. Since the cross sectional area of the gas flow path in the inner portion of each bundle is made larger than the cross sectional area of the gas flow path in the outer portion, it is possible to uniformize a molar flow rate of the gas even if the temperature distribution is not uniform.

A material of the flow path cross sectional area adjusting member 7 desirably employs a material having an electric insulating property and a great gas flow resistance, for example, an alumina or a silica. It is possible to form the flow path cross sectional area adjusting member by a dense body, a porous body, a fiber forming body or the like of the alumina or the silica.

In the present embodiment, a distance between the electrical insulating plates 8 surrounding the bundle 3 is longer toward the inner portion of each of the bundles by arranging the flow path cross sectional area adjusting member 7, whereby the fuel flow path 4 becomes wider. Further, the fuel flow path of the inner portion of the power generation module becomes widest by making the distance between the electrical insulating plates 8 in the middle line larger than the other lines in the bundles 3 arranged in three lines in parallel. Accordingly, a horizontal cross sectional area of the fuel flow path 4 becomes wider toward the inner portion of the power generation module, and the fuel tends to flow. In this case, the fuel flow path 4 corresponds to a region surrounded by the fuel cell 1, the collecting member 2, the collecting plate 6 and the flow path cross sectional area adjusting member 7.

A thickness distribution of the flow path cross sectional area adjusting member 7 and a distance distribution between the electrical insulating plates are determined in such a manner that the molar flow rate of the fuel supplied to each of the fuel cells becomes uniform while taking into consideration a temperature distribution. Accordingly, it is possible to uniformize a fuel utilization in each of the fuel cells, and it is possible to prevent a voltage reduction due to a local ascent of the fuel utilization. Further, since the fuel utilization distribution is small, it is possible to increase an average fuel utilization and it is possible to improve a power generation efficiency.

Further, since the gas flow rate to the inner portion of the power generation module is increased in the present embodiment, the inner portion is cooled and the temperature distribution is lowered.

The present invention is structured by making the gas flow path cross sectional area of the fuel or the oxidizer in the inner portion of the power generation module larger than the gas flow path cross sectional area in the outer portion of the power generation module. However, in this case, the center portion of the power generation module does not indicate one fuel cell existing in the inner portion of the module, but indicates a plurality of fuel cells positioned in the inner portion of the module. In the case of the power generation module having the structure shown in FIG. 1, six fuel cells positioned in the inner portion of the bundle in the middle line in the bundles arranged in three lines are defined as the fuel cells in the inner portion of the module. The present invention is structured by making the cross sectional area of the fuel flow path or the oxidizer flow path of six fuel cells positioned in the inner portion of the module larger than the other portions.

Embodiment 2

The present embodiment is structured by setting the electrical insulating plate in such a manner as to double as the flow path cross sectional area adjusting member, thereby omitting the flow path cross sectional area adjusting member, in the fuel cell power generation system having the structure in FIG. 1.

Figure 2:
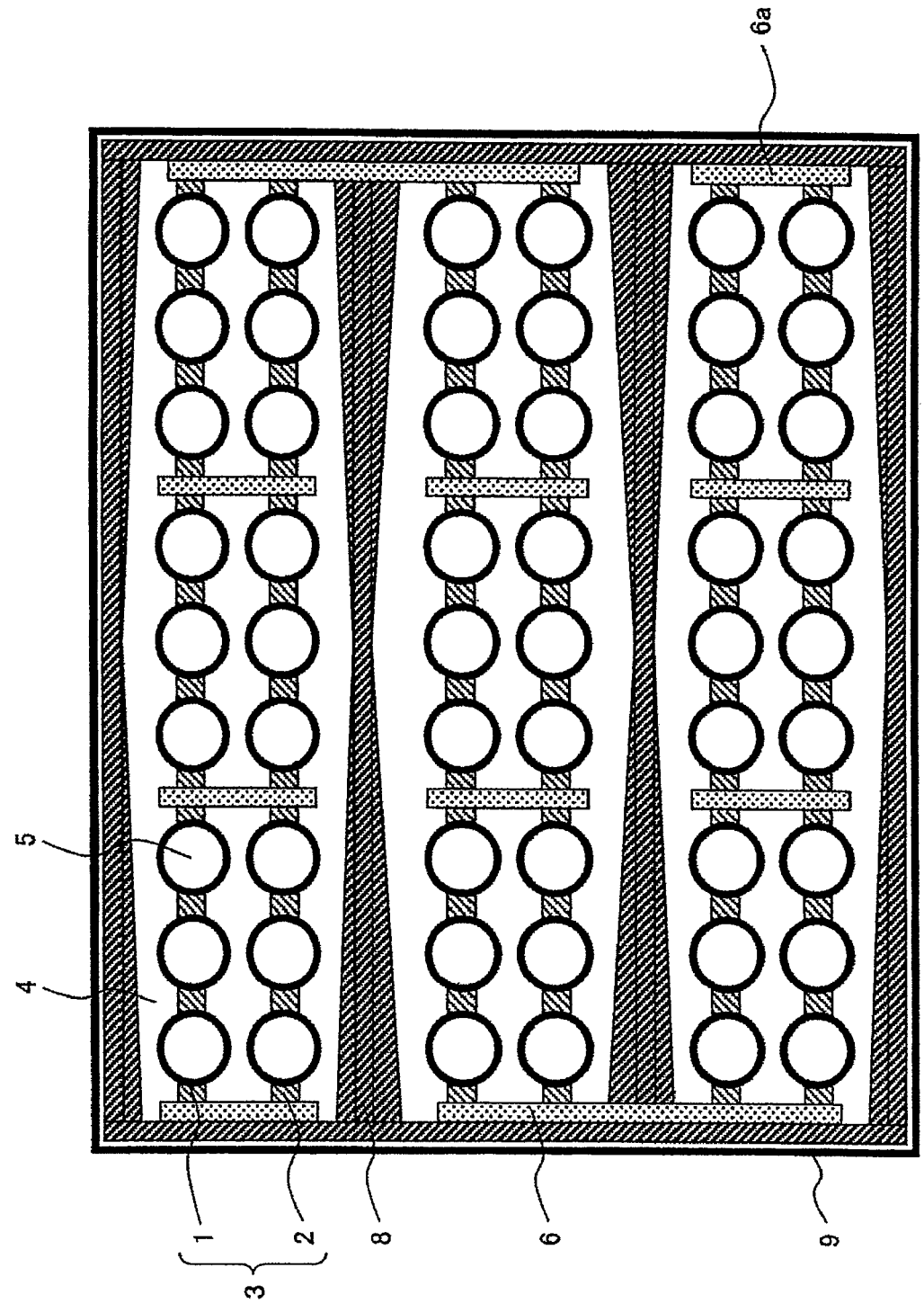
FIG. 2 is a schematic view of a fuel cells power generation module in accordance with a second embodiment of the present invention.

A horizontal cross sectional view of the power generation module in accordance with the present embodiment is shown in FIG. 2. The structure is made such that the thickness of the electrical insulating plate 8 is larger in the outer portion of the bundle, and the thickness thereof is smaller in the inner portion of the bundle, in place of making the thickness of the electrical insulation plate 8 constant. In accordance with the present embodiment, the parts number is reduced and the structure is simplified.

Embodiment 3

A horizontal cross sectional view of a power generation module in accordance with the present embodiment is shown in FIG. 3. In the present embodiment, the distance between the fuel cells in the inner portion of the power generation module is made larger in comparison with that of the fuel cells in the outer portion. Further, the distance between the fuel cells in the inner portion of the middle line of the power generation module is made larger than the distance between the fuel cells in the inner portion in the other lines. Accordingly, the fuel flow path in the inner portion of the power generation module becomes wider, and the fuel tends to flow.

In accordance with the present embodiment, it is possible to reduce a flow rate difference between the fuel flowing through the fuel flow path surrounded by the fuel cell 1 and the collecting member 2 in the bundle 3, and the fuel flowing through the fuel flow path between the fuel cell and the flow path cross sectional area adjusting member 7.

Embodiment 4

A horizontal cross sectional view of a power generation module in accordance with the present embodiment is shown in FIG. 4. In the present embodiment, the flow path cross sectional area is adjusted per the bundle by making the distance between the electrical insulating plates 8 in the middle line larger than the distance between the electrical insulating plates in the other lines, and changing the thickness of the flow path cross sectional area adjusting member 7 positioned in the middle line from the thickness of the flow path cross sectional area adjusting member 7 positioned in the other lines. Further, a plate having a constant thickness is used for the flow path cross sectional area adjusting member, and is arranged at a predetermined position. With the structure in accordance with the present embodiment, it is possible to use the plate having the constant thickness as the flow path cross sectional area adjusting member 7, and it is easy to machine the plate. Further, the flow path cross sectional area adjusting member 7 is in parallel to the bundle, and it is easy to position the bundle.

Embodiment 5

A side elevational cross sectional view of the power generation module in accordance with the present embodiment is shown in FIG. 5. Air 12 is fed to a fuel cell bottom portion through an air introduction pipe 10, and thereafter flows upwards. Fuel 11 flows from a bottom portion upwards. The fuel and the air after the cell reaction are mixed in a space in an upper portion of the fuel cell, and are discharged as exhaust gas 13. In the present embodiment, the structure is made such that a fuel flow path cross sectional area of an inner portion in an axial direction in an inner bundle coming to a high temperature becomes larger. Accordingly, in the inner portion in the axial direction of the inner bundle, the fuel reaches the stage of flowing from the peripheral bundle, and it is possible to keep the fuel molar flow rate uniform even in the state in which the temperature distribution is not uniform in the axial direction.

It should be further understood by those skilled in the art that the foregoing description has been made on embodiments of the invention, however, the present invention is not limited thereto, and that various changes and modifications may be made in the invention without departing from the spirit of the invention and the scope of the appended claims.

The invention claimed is:

1. A fuel cells power generation system in which a bundle is formed by electrically connecting a plurality of cylindrical solid oxide fuel cells, a power generation module is formed by collecting a plurality of said bundles and electrically connecting said bundles by a collecting plate, and an outer space of cylindrical solid oxide fuel cells forms a gas flow path of fuel or oxidizer and an inner space of said cylindrical solid oxide fuel cells forms a gas flow path of oxidizer or fuel, respectively, wherein a cross sectional area of the gas flow path formed in said outer space of said cylindrical solid oxide fuel cells in an inner portion of said power generation module is larger in comparison with an outer portion of said power generation module, wherein said power generation module is formed by arranging a plurality of lines in parallel, each of which lines is formed by disposing said bundles linearly, a plurality of electrical insulating plates comparting said lines from each other are provided to provide outer lines and at least one middle line, and each of said electrical insulating plates is provided with a flow path cross sectional area adjusting member which fills in a part of said outer space of said cylindrical solid oxide fuel cells so as to narrow the gas flow path, whereby a cross sectional area of said gas flow path in said outer space of said cylindrical solid oxide fuel cells positioned in the inner portion in the middle line of said power generation module is the largest.

2. The fuel cells power generation system as claimed in claim 1, wherein said flow path cross sectional area adjusting member is provided in such a manner that the cross sectional area of the gas flow path in said outer space of said cylindrical solid oxide fuel cells in the inner portion in each line is larger than that in the outer portion of each line.

3. The fuel cells power generation system as claimed in claim 1, wherein said flow path cross sectional area adjusting member is provided in such a manner that the cross sectional area of the gas flow path in said outer space of said cylindrical solid oxide fuel cells is larger in the inner portion in a gas flow direction and smaller in the outer portion in a gas flow direction of said bundles, whereby the cross sectional area of the gas flow path in said outer space of said cylindrical solid oxide fuel cells in the inner portion in the middle line of said power generation module is larger than that in the outer portion of said middle line.

4. The fuel cells power generation system as claimed in claim 1, wherein a distance between said cylindrical solid oxide fuel cells in the inner portion of said power generation module is larger than that in the outer portion of said power generation module.

5. The fuel cells power generation system as claimed in claim 1, wherein a distance between said cylindrical solid oxide fuel cells positioned in the inner portion of the power generation module is larger in comparison with that of said cylindrical solid oxide fuel cells positioned in the outer portion of the power generation module.

6. The fuel cells power generation system as claimed in claim 1, wherein said power generation module is formed by arranging a plurality of lines in parallel, each of which lines is formed by disposing a plurality of said bundles linearly, said bundles are comparted from each other by electrical insulating plates to provide outer lines and at least one middle line, and a thickness of each of said electrical insulating plates is changed in such a manner as to be larger in the outer portion and smaller in the inner portion of said bundles, whereby a cross sectional area of the gas flow path in said outer space of said cylindrical solid oxide fuel cells positioned in the inner portion in the middle line of the power generation module is the largest.

7. A fuel cells power generation system in which a bundle is formed by electrically connecting a plurality of cylindrical solid oxide fuel cells, a power generation module is formed by arranging a plurality of lines in parallel, each of which lines is formed by disposing a plurality of said bundles linearly, and an outer space of cylindrical fuel cells forms a gas flow path of fuel or oxidizer and an inner space of said cylindrical solid oxide fuel cells forms a gas flow path of oxidizer or fuel, respectively, wherein a cross sectional area of the gas flow path formed in said outer space of said cylindrical solid oxide fuel cells in an inner portion of said power generation module is larger in comparison with an outer portion of said power generation module, and the cross sectional area of the gas flow path formed in said outer space of said cylindrical solid oxide fuel cells in the inner portion of said bundle positioned in a middle line of said power generation module is the largest, wherein said bundles are comparted from each other by electrical insulating plates to provide outer lines and at least one middle line, and a distance between said electrical insulating plates in the middle line of said power generation module is larger than that in the outer lines of said power generation module.

8. The fuel cells power generation system as claimed in claim 7, wherein said bundles are comparted from each other by electrical insulating plates to provide outer lines and at least one middle line, and each electrical insulating plate is provided with a flow path cross sectional area adjusting member disposed in said outer space of said cylindrical solid oxide fuel cells so as to narrow the gas flow path, whereby a cross sectional area of the gas flow path in said outer space of said cylindrical solid oxide fuel cells positioned in the inner portion of one of said bundles is larger in comparison with the cross sectional area of the gas flow path of the fuel cells positioned in the outer portion of said bundle.

9. The fuel cells power generation system as claimed in claim 7, wherein said bundles are comparted from each other by electrical insulating plates to provide outer lines and at least one middle line, and a thickness of each electrical insulating plate is larger in the outer portion and smaller in the inner portion of said bundles, whereby a cross sectional area of the gas flow path in said outer space of said cylindrical solid oxide fuel cells positioned in the inner portion of one of said bundles is larger in comparison with the cross sectional area of the gas flow path of said solid oxide fuel cells positioned in the outer portion of said bundle.

* * * * *